United States Patent [19]

Wada

[11] 3,995,875
[45] * Dec. 7, 1976

[54] TRICYCLE

[75] Inventor: Hiroshi Wada, Hamamatsu, Japan
[73] Assignee: Suzuki Motor Company Limited, Shizuoka, Japan
[*] Notice: The portion of the term of this patent subsequent to Apr. 29, 1975, has been disclaimed.
[22] Filed: Sept. 9, 1974
[21] Appl. No.: 504,306
[30] Foreign Application Priority Data
Sept. 12, 1973 Japan .............................. 48-106944
[52] U.S. Cl. .............................. 280/282; 280/111
[51] Int. Cl.² .......................................... B62K 5/06
[58] Field of Search ................ 280/282, 283, 87 R, 280/111, 112, 87.04 R, 87.04 A, 11.19
[56] References Cited
UNITED STATES PATENTS

| 387,631 | 8/1888 | Duryea | 280/282 X |
|---------|--------|--------|-----------|
| 2,474,946 | 7/1949 | Kinslow | 280/87.04 A |
| 2,696,387 | 12/1954 | Nordin | 280/87 R X |
| 3,504,934 | 4/1970 | Wallis | 280/282 |
| 3,583,727 | 6/1971 | Wallis | 280/283 |
| 3,649,038 | 3/1972 | Huckenbeck | 280/11.19 X |
| 3,827,519 | 8/1974 | Snider | 280/282 X |
| 3,880,449 | 4/1975 | Wada | 280/282 |

FOREIGN PATENTS OR APPLICATIONS 616,723  1/1949  United Kingdom ........ 280/87.04 A

*Primary Examiner*—Robert R. Song
*Assistant Examiner*—John A. Pekar
*Attorney, Agent, or Firm*—Littlepage, Quaintance, Murphy & Dobyns

[57] ABSTRACT

A tricycle having unique rear-wheel suspension means is provided. The rear-wheel suspension means includes a rear frame rotatably bearing two rear wheels. The rear frame is disclosed with a connection shaft perpendicularly thereto substantially at its central portion. The connection shaft is rotatably inserted into a cylindrical boss which is provided adjacent to the end portion of the main frame of the tricycle such that when the connection shaft is inserted into the boss and when the tricycle is normally put on the ground, the extension of the axis of the shaft passes through a certain point below the ground contact point of the front wheel.

7 Claims, 5 Drawing Figures

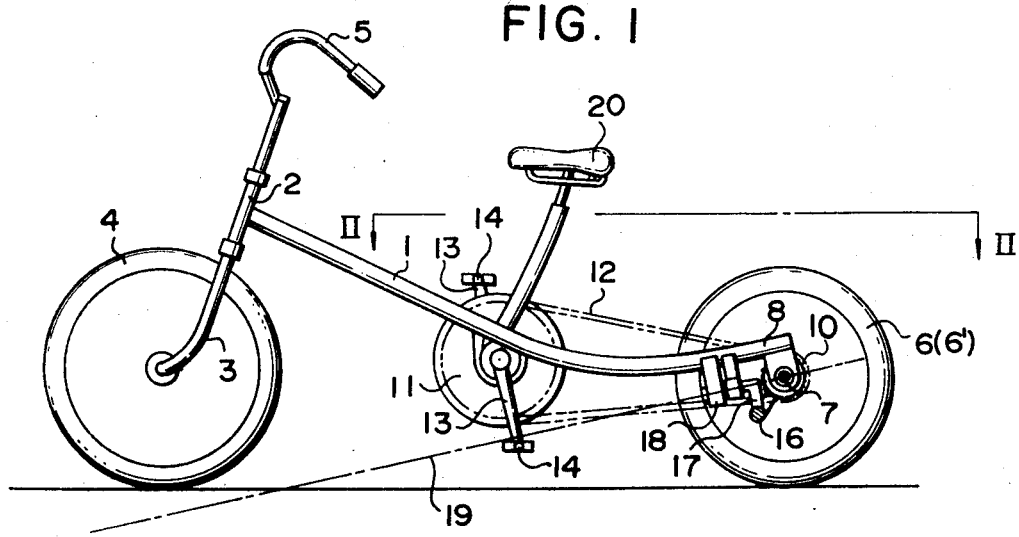
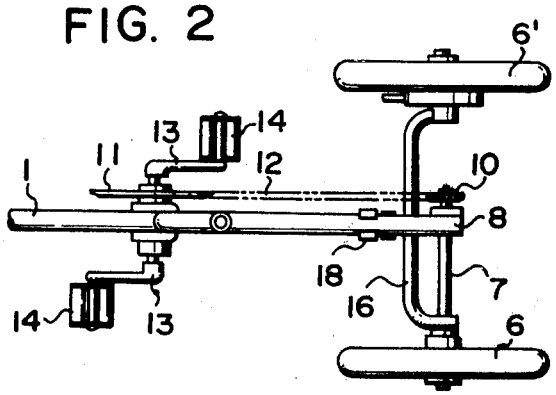
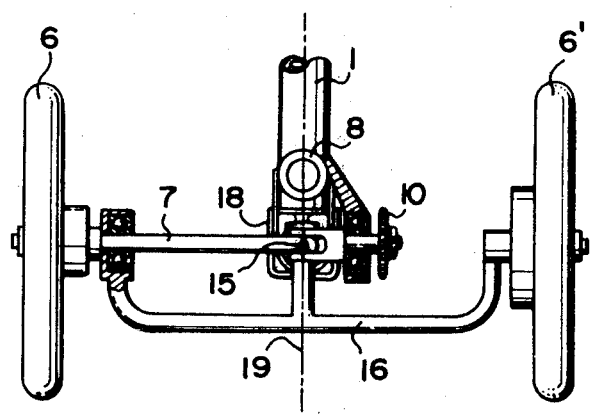

TRICYCLE

BACKGROUND OF THE INVENTION

The present invention relates to a tricycle and in particular to a tricycle having unique rear-wheel suspension means which enable the tricycle to turn with a smaller turning-radius.

In a conventional tricycle, since the main frame provided with a front wheel and the rear frame provided with two rear wheels are integrally fixed to each other, when the main frame is inclined in the direction in which the tricycle is intended to turn the rear frame is also inclined with respect to the ground so that the outer rear wheel with respect to the direction in which the tricycle is intended to turn rises up in the air. Therefore, the tricycle sometimes overturns.

To prevent this overturning, the rider has to turn only the front wheel in the turning direction without inclining the main frame with the disadvantage that there is a limit in the reduction of turning-radius.

SUMMARY OF THE INVENTION

Therefore, an object of the invention is to eliminate the above mentioned disadvantage of the conventional tricycle and to provide a tricycle which is able to turn with a smaller turning radius.

Another object of the present invention is to provide a tricycle having unique rear-wheel suspension means which includes a rear frame rotatably bearing two rear wheels. The rear frame provided with a connection shaft perpendicularly thereto substantially at its central portion. The connection shaft is rotatably inserted into a cylindrical boss which is provided adjacent to the end portion of the main frame of the tricycle such that when the connection shaft is inserted into the boss and when the tricycle stands on the ground with the main frame in a vertical plane, the extension of the axis of the shaft passes through a point below the ground contact point of the front wheel.

The foregoing and other objects as well as the characteristic features of the invention will become more apparent and more readily understandable by the following description and the appended claims, when read in conjunction with the accompanying drawings.

BRIEF DESCRIPTION OF THE DRAWINGS

FIG. 1 is a partially sectional longitudinal side view of a tricycle illustrating an embodiment of the present invention;

FIG. 2 is a plan view along the line II—II of FIG. 1;

FIG. 3 is an enlarged rear view of the tricycle of FIG. 1;

DETAILED DESCRIPTION OF THE INVENTION

Figure 4:
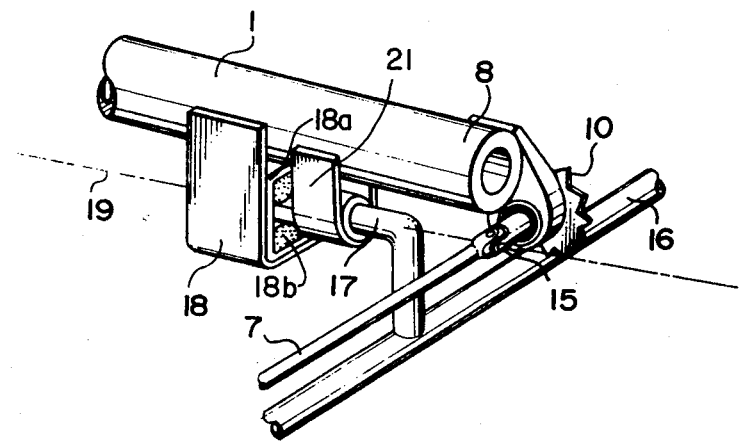
FIG. 4 is an enlarged perspective view of the rear portion of the tricycle.

The present invention will be described hereinafter with a preferred embodiment.

Referring to the drawings, a main frame 1 is provided with a head tube 2 at its front end portion and a front fork 3 rotatably mounted in the head tube 2 extending downward. A handle bar 5 is connected to the front fork 3 within the head tube 2. The front fork 3 is rotatably provided with a front wheel 4.

The main frame 1 is also provided with a driving shaft 7 horizontally at a rear end portion 8. The driving shaft 7 is provided with one 6 of two rear wheels 6, 6' at one end and a sprocket wheel 10 at the other end. The sprocket wheel 10 is linked with another sprocket wheel 11 by a chain 12. The sprocket wheel 11 is provided with a pedal arm 13 which is integrally provided with a pair of pedals 14.

The sprocket wheel 10 on the driving shaft 7 and the rear wheel 6 are linked with each other by a universal joint 15 which is disposed substantially at the central portion between the rear wheels 6 and 6'. The two rear wheels 6 and 6' are borne by a rear frame 16 with a certain distance maintained therebetween. The rear frame 16 is provided with a rigid angled member providing a connection shaft 17 perpendicularly to the axis (not shown) of the driving shaft 7 substantially at the central portion of the rear frame 16. The connection shaft 17 is rockably inserted into a boss 18 which is provided on the main frame 1 in front of the rear end 8 thereof. The boss 21 supports the connection shaft 17 in the manner such that the extension of the axis 19 of the connection shaft 17 passes through a point below the ground contact point of the front wheel 4 when the tricycle stands on the ground with the main frame in a vertical plane. The tricycle is provided with a saddle 20 as shown in FIG. 1. Adjacent to the boss 21, a resilient support 18 is fixably mounted to the rear end portion of the main frame 1. The resilient support 18, as better shown in FIG. 4, constitutes a Neidhart mechanism which is known in the art, i.e. U.S. Pat. No. 2,729,442. It comprises a mounting bracket 18a and resilient members 18b a rubber or the like disposed in the four corners of bracket 18a. A square-shaped columnar extension of the shaft 17 is inserted into the center of bracket 18a surrounded by the resilient members 18b.

When the thus arranged tricycle runs in a straight line, the plane containing the main frame 1 and the boss 18 is perpendicular to the ground and the tricycle runs in a conventional manner.

Figure 5:
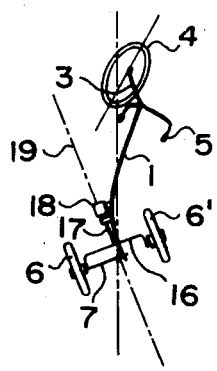
FIG. 5 is a view showing the turning of the main frame and the rear frame when the tricycle is turned.

On the other hand, when the rider turns the handle bar 5 to turn the tricycle in the desired direction and inclines the plane containing the main frame 1 with respect to the ground the extension of the axis 19 forms a certain angle in the opposite direction to the turning direction of the handle bar 5 with the main frame 1 when viewed in plan, as shown in FIG. 5. Accordingly, the assembly of the rear frame 16 and the rear wheels 6 and 6' turns in the opposite direction to the turning direction of the front wheel 4 because the rear frame 16 is integrated with the connection shaft 17 inserted into the boss 18. In this case, since the rear wheel 6' on the side to which the plane containing the main frame 1 is inclined is exerted with an upward force from the ground, the connection shaft 17 inserted into the boss 18 rotates so as to keep the opposite rear wheel 6 in contact with the ground. Thus, the two rear wheels 6 and 6' turn in the opposite direction to the turning direction of the handle 5 in such a way that they are kept in contact with the ground.

Thus, the tricycle having unique rear-wheel suspension means according to the present invention can turn with a smaller turning-radius when compared with conventional ones because the rear frame turns in the opposite direction to the turning direction of the handle bar.

Further, even if the rider inclines the plane including the main frame in order to turn the running direction, the outer rear wheel with respect to the turning direction of the handle does not rise up in the air but is kept in contact with the ground, differing from the conventional tricycles, with an advantage in that the rider can operate the tricycle in the same manner as a bicycle with no fear of overturning due to the rising up of the outer rear wheel.

What is claimed is:

1. A tricycle comprising
   a main frame,
   a single front wheel and supporting means provided at a forward end of said main frame for steerably supporting the front wheel, said front wheel normally contacting the ground at a ground contact point,
   two rear wheels and a transversely extending rear frame means, separate from said main frame, for rotatably supporting the two rear wheels on opposite ends thereof,
   connecting means provided at a rear end of said main frame for connecting said main frame to said rear frame, said connecting means comprising a boss fixed to said main frame and a connecting shaft affixed to said rear frame and pivotably disposed in said boss such that an extension of the axis of said shaft disposed in said boss passes below said ground contact point of the front wheel and when the plane containing the main frame is perpendicular to the ground and,
   rear wheel driving means for driving one of said rear wheels.

2. A tricycle according to claim 1 wherein said rear frame means further comprises a driving shaft rotatably connected to said main frame at the rear end of said main frame, the driving shaft being disposed substantially in parallel with said rear frame, one of said rear wheels being fixed to one end of said driving shaft, said driving shaft being composed of two sections connected by a universal joint disposed therebetween, said driving shaft being connected to and driven by said rear wheel driving means.

3. A tricycle according to claim 2, wherein said rear wheel driving means includes a first sprocket wheel provided substantially at the central and side portion of said main frame and a second sprocket wheel provided on said driving shaft, said first and second sprocket wheels being linked with each other by a chain, said first sprocket wheel being driven by a pair of pedals connected thereto.

4. A tricycle according to claim 2, wherein said universal joint is disposed substantially at the central portion between said rear wheels.

5. The tricycle according to claim 1 wherein said boss of said connecting means comprises a cylindrical boss provided on a lower side of and adjacent to the rear end portion of said main frame substantially within the plane containing said main frame, and wherein said connecting shaft is affixed to said rear frame perpendicularly thereto substantially at its central portion, said connecting shaft being rotatably inserted into said cylindrical boss.

6. The tricycle according to claim 1 wherein said supporting means for the front wheel comprises a head tube fixed to a front end of the main frame in the plane of the main frame, a fork steerably mounted in the head tube and extending downwardly therefrom, the fork rotatably supporting the single front wheel at a lower end thereof, and a handlebar fixed through said head tube to said fork for steerable rotation therewith.

7. A tricycle comprising
   a main frame,
   a front wheel and supporting means provided at a forward end of said main frame for steerably supporting said front wheel.
   two rear wheels and rear wheel suspension means provided at a rear end of said main frame for suspending two rear wheels in such a manner that when the frame containing said main frame is inclined in order to turn the running direction of said tricycle, said rear wheels are turned in an opposite direction to the turning direction of said front wheel, said rear wheel suspension means comprising
   a driving shaft rotatably connected to said main frame at a rear end of said main frame, said driving shaft being provided with one of rear wheels at one end of said driving shaft, said driving shaft being composed of two sections connected by a universal joint disposed therebetween,
   a rear frame, disposed substantially in parallel with said driving shaft for rotatably supporting said one and the other rear wheels at the respective opposite ends of said rear frame,
   a cylindrical boss provided on the lower side of and adjacent to the end portion of said main frame substantially within the plane containing said main frame,
   a connection shaft provided on said rear frame perpendicularly thereto and substantially at the central portion of said rear frame, said connection shaft being rotatably inserted into cylindrical boss, said boss being disposed in a manner such that an extension of the axis of said shaft disposed in said cylindrical boss passes a certain point below a ground contact point of said front wheel when the plane containing said main frame is perpendicular to the ground and
   rear wheel driving means for driving one of said rear wheels, said driving shaft being driven by said rear wheel driving means.

* * * * *

UNITED STATES PATENT AND TRADEMARK OFFICE
CERTIFICATE OF CORRECTION

PATENT NO. : 3,995,875
DATED : December 7, 1976
INVENTOR(S) : Hiroshi Wada

It is certified that error appears in the above-identified patent and that said Letters Patent are hereby corrected as shown below:

```
On the title page, line 6, "1975" should read --1992--.
Column 2, lines 19, 39, 52, and 56, change "18" to --21--.
Column 2, line 33, change "a" to --of--.
Column 2, line 19, after "rockably" insert --and pivotably--.
Column 3, line 2, after "handle" insert --bar--.
```

Signed and Sealed this

Seventeenth Day of May 1977

[SEAL]

Attest:

RUTH C. MASON
*Attesting Officer*

C. MARSHALL DANN
*Commissioner of Patents and Trademarks*